(12) United States Patent
Ballenger et al.

(10) Patent No.: US 7,224,151 B2
(45) Date of Patent: *May 29, 2007

(54) FIXED PHASE POWER CONTROLLER WITH ANALOG TRIGGER

(75) Inventors: Matthew B. Ballenger, Lexington, KY (US); Ernest C. Weyhrauch, Cookeville, TN (US)

(73) Assignee: Osram Sylvania Inc., Danvers, MA (US)

( * ) Notice: Subject to any disclaimer, the term of this patent is extended or adjusted under 35 U.S.C. 154(b) by 44 days.

This patent is subject to a terminal disclaimer.

(21) Appl. No.: 11/051,943

(22) Filed: Feb. 4, 2005

(65) Prior Publication Data

US 2005/0122086 A1    Jun. 9, 2005

(51) Int. Cl.
  *G05F 1/10*  (2006.01)
  *H05B 37/00* (2006.01)
(52) U.S. Cl. .................... 323/237; 315/207; 315/203
(58) Field of Classification Search ............... 315/203, 315/205, 208, 207; 323/237, 242, 300, 320, 323/325, 327, 365, 902
See application file for complete search history.

(56) References Cited

U.S. PATENT DOCUMENTS

| 3,275,922 A | 9/1966 | Meyer et al. ............... 321/15 |
| 3,869,631 A | 3/1975 | Anderson et al. ........... 313/217 |
| 4,300,075 A * | 11/1981 | Foose et al. ................ 315/307 |
| 4,480,211 A | 10/1984 | Eggers ......................... 315/70 |
| 4,500,813 A | 2/1985 | Weedall ...................... 315/276 |
| 4,504,778 A * | 3/1985 | Evans ......................... 323/323 |
| 4,893,063 A | 1/1990 | Pernyeszi .................... 315/307 |
| 4,922,155 A | 5/1990 | Morris et al. ................ 315/205 |
| 5,859,506 A | 1/1999 | Lemke ........................ 315/308 |
| 6,208,090 B1 | 3/2001 | Skilskyj et al. ............. 315/360 |
| 6,445,133 B1 | 9/2002 | Lin et al. ...................... 315/57 |
| 6,734,643 B2 * | 5/2004 | Okamoto et al. ........... 315/336 |

* cited by examiner

Primary Examiner—Shih-Chao Chen
Assistant Examiner—Minh Dieu A
(74) Attorney, Agent, or Firm—Carlo S. Bessone

(57) ABSTRACT

A fixed phase power controller that converts a line voltage to an RMS load voltage includes an analog control block with a capacitor that receives an input that is independent of a change in magnitude of the line voltage and that charges and discharges to provide a trigger signal at a first frequency, a reset circuit that periodically resets an initial condition of the analog control block, a synchronization connection that provides a sync signal that synchronizes the trigger signal with a waveform of the line voltage, and a control circuit that clips a load voltage based on the synchronized trigger signal to define the RMS load voltage. The controller finds application in a lamp where it reduces the line voltage to an RMS load voltage suitable for a light emitting element.

4 Claims, 5 Drawing Sheets

FIXED PHASE POWER CONTROLLER WITH ANALOG TRIGGER

BACKGROUND OF THE INVENTION

The present invention is directed to a power controller that supplies a specified power to a load, and more particularly to a voltage converter for a lamp that converts line voltage to a voltage suitable for lamp operation.

Some loads, such as lamps, operate at a voltage lower than a line (or mains) voltage of, for example, 120V or 220V, and for such loads a voltage converter that converts line voltage to a lower operating voltage must be provided. The power supplied to the load may be controlled with a phase-control power circuit that includes an RC circuit. Some loads, such as lamps, operate most efficiently when the power is constant (or substantially so). However, line voltage variations are magnified by phase-control power circuits due to their inherent properties, thereby decreasing the stability of the power supplied to the load.

A simple four-component RC phase-control clipping circuit demonstrates a problem of conventional phase-control clipping circuits. The phase-controlled clipping circuit shown in FIG. 1 has a capacitor 22, a diac 24, a triac 26 that is triggered by the diac 24, and resistor 28. The resistor 28 may be a potentiometer that sets a resistance in the circuit to control a phase at which the triac 26 fires.

In operation, a clipping circuit such as shown in FIG. 1 has two states. In the first state the diac 24 and triac 26 operate in the cutoff region where virtually no current flows. Since the diac and triac function as open circuits in this state, the result is an RC series network. Due to the nature of such an RC series network, the voltage across the capacitor 22 leads the line voltage by a phase angle that is determined by the resistance and capacitance in the RC series network. The magnitude of the capacitor voltage $V_C$ is also dependent on these values.

The voltage across the diac 24 is analogous to the voltage drop across the capacitor 22 and thus the diac will fire once breakover voltage $V_{BO}$ is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the clipping circuit.

Triggering of the triac 26 in the clipping circuit is forward phase-controlled by the RC series network and the leading portion of the line voltage waveform is clipped until triggering occurs as illustrated in FIG. 2. A load attached to the clipping circuit experiences this clipping in both voltage and current due to the relatively large resistance in the clipping circuit.

Accordingly, the RMS load voltage and current are determined by the resistance and capacitance values in the clipping circuit since the phase at which the clipping occurs is determined by the RC series network and since the RMS voltage and current depend on how much energy is removed by the clipping.

With reference to FIG. 3, clipping is characterized by a conduction angle $\alpha$ and a delay angle $\theta$. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting.

Define $V_{irrms}$ as RMS line voltage, $V_{orms}$ as RMS load voltage, T as period, and $\omega$ as angular frequency (rad) with $\omega = 2\pi f$.

Line voltage may vary from location to location up to about 10% and this variation can cause a harmful variation in RMS load voltage in the load (e.g., a lamp). For example, if line voltage were above the standard for which the voltage conversion circuit was designed, the triac 26 may trigger early thereby increasing RMS load voltage. In a halogen incandescent lamp, it is particularly desirable to have an RMS load voltage that is nearly constant.

Changes in the line voltage are exaggerated at the load due to a variable conduction angle, and conduction angle is dependent on the rate at which the capacitor voltage reaches the breakover voltage of the diac. For fixed values of frequency, resistance and capacitance, the capacitor voltage phase angle ($\theta_C$) is a constant defined by $\theta_C = \arctan(-\omega RC)$. Therefore, the phase of $V_C$ is independent of the line voltage magnitude. However, the rate at which $V_C$ reaches $V_{BO}$ is a function of $V_{irrms}$ and is not independent of the line voltage magnitude.

FIG. 4 depicts two possible sets of line voltage $V_i$ and capacitor voltage $V_C$. As may be seen therein, the rate at which $V_C$ reaches $V_{BO}$ varies depending on $V_{irrms}$. For RC phase-control clipping circuits the point at which $V_C = V_{BO}$ is of concern because this is the point at which diac/triac triggering occurs. As $V_{irrms}$ increases, $V_C$ reaches $V_{BO}$ earlier in the cycle leading to an increase in conduction angle ($\alpha_2 > \alpha_1$), and as $V_{irrms}$ decreases, $V_C$ reaches $V_{BO}$ later in the cycle leading to a decrease in conduction angle ($\alpha_2 < \alpha_1$).

Changes in $V_{irrms}$ leading to exaggerated or disproportional changes in $V_{orrms}$ are a direct result of the relationship between conduction angle and line voltage magnitude. As $V_{irrms}$ increases, $V_{orrms}$ increases due to both the increase in peak voltage and the increase in conduction angle, and as $V_{irrm}$ decreases, $V_{orrm}$ decreases due to both the decrease in peak voltage and the decrease in conduction angle. Thus, load voltage is influenced twice, once by a change in peak voltage and once by a change in conduction angle, resulting in unstable RMS load voltage conversion for the simple phase-control clipping circuit.

When a voltage converter is used in a lamp, the voltage converter may be provided in a fixture to which the lamp is connected or within the lamp itself. U.S. Pat. No. 3,869,631 is an example of the latter, in which a diode is provided in an extended stem between the lamp screw base and stem press of the lamp for clipping the line voltage to reduce RMS load voltage at the light emitting element. U.S. Pat. No. 6,445,133 is another example of the latter, in which a voltage conversion circuit for reducing the load voltage at the light emitting element is divided with a high temperature-tolerant part in the lamp base and a high temperature-intolerant part in a lower temperature part of the lamp spaced from the high temperature-tolerant part.

Factors to be considered when designing a voltage converter that is to be located within a lamp include the sizes of the lamp and voltage converter, costs of materials and production, production of a potentially harmful DC load on a source of power for installations of multiple lamps, and the operating temperature of the lamp and an effect of the operating temperature on a structure and operation of the voltage converter.

SUMMARY OF THE INVENTION

An object of the present invention is to provide a novel fixed phase power controller that converts a line voltage to an RMS load voltage using an analog trigger.

A further object is to provide a fixed phase power controller and method in which an analog device, such as a capacitor, receives an input that is independent of a change in magnitude of a line voltage and charges and discharges to provide an analog trigger signal at a first frequency that defines the RMS load voltage, in which a reset circuit periodically resets an initial condition of the analog device, in which a sync signal synchronizes the trigger signal with a waveform of the line voltage, and in which a control circuit clips a load voltage based on the analog trigger signal to define the RMS load voltage.

A yet further object is to provide a lamp with this fixed phase power controller in a voltage conversion circuit that converts a line voltage at a lamp terminal to the RMS load voltage usable by a light emitting element of the lamp.

DESCRIPTION OF PREFERRED EMBODIMENTS

Figure 1:
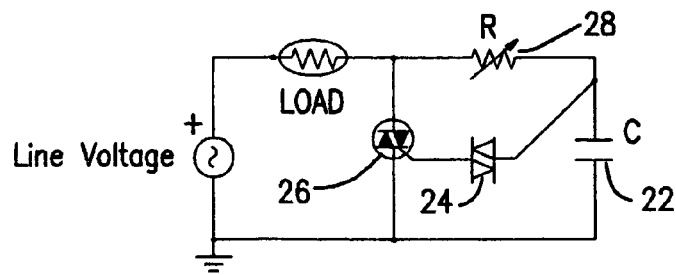
FIG. 1 is a schematic circuit diagram of a phase-controlled dimming circuit of the prior art.
Figure 2:
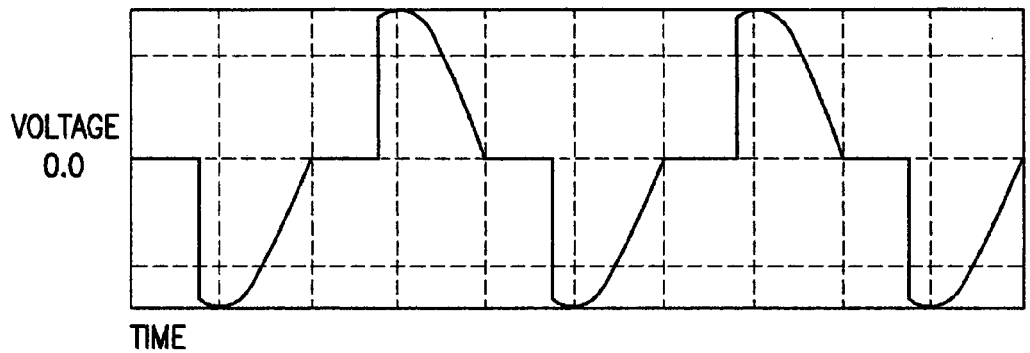
FIG. 2 is a graph illustrating voltage clipping in the phase-controlled dimming circuit of FIG. 1.
Figure 3:
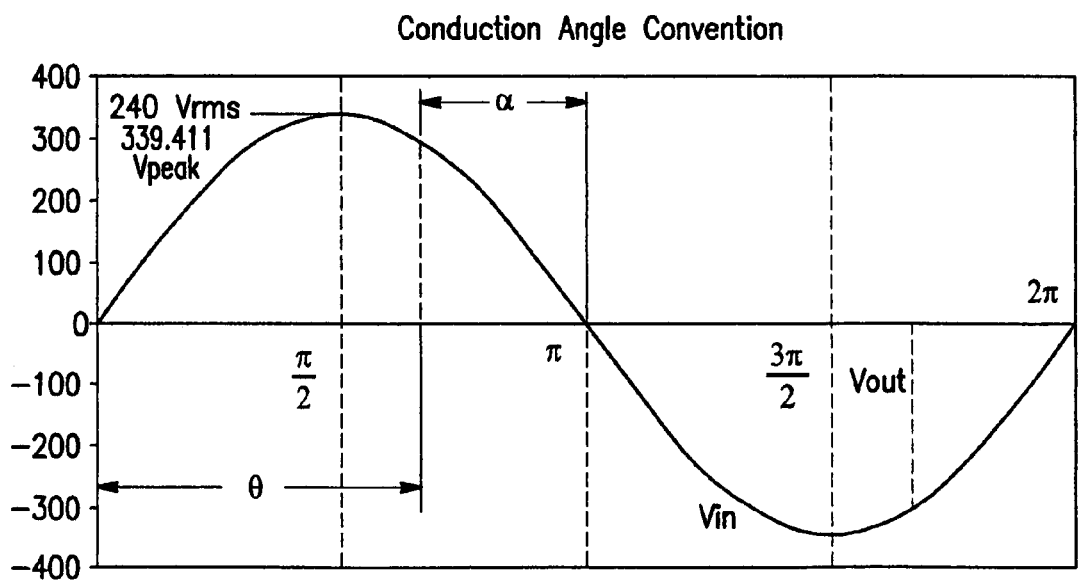
FIG. 3 is a graph showing the conduction angle convention adopted herein.
Figure 4:
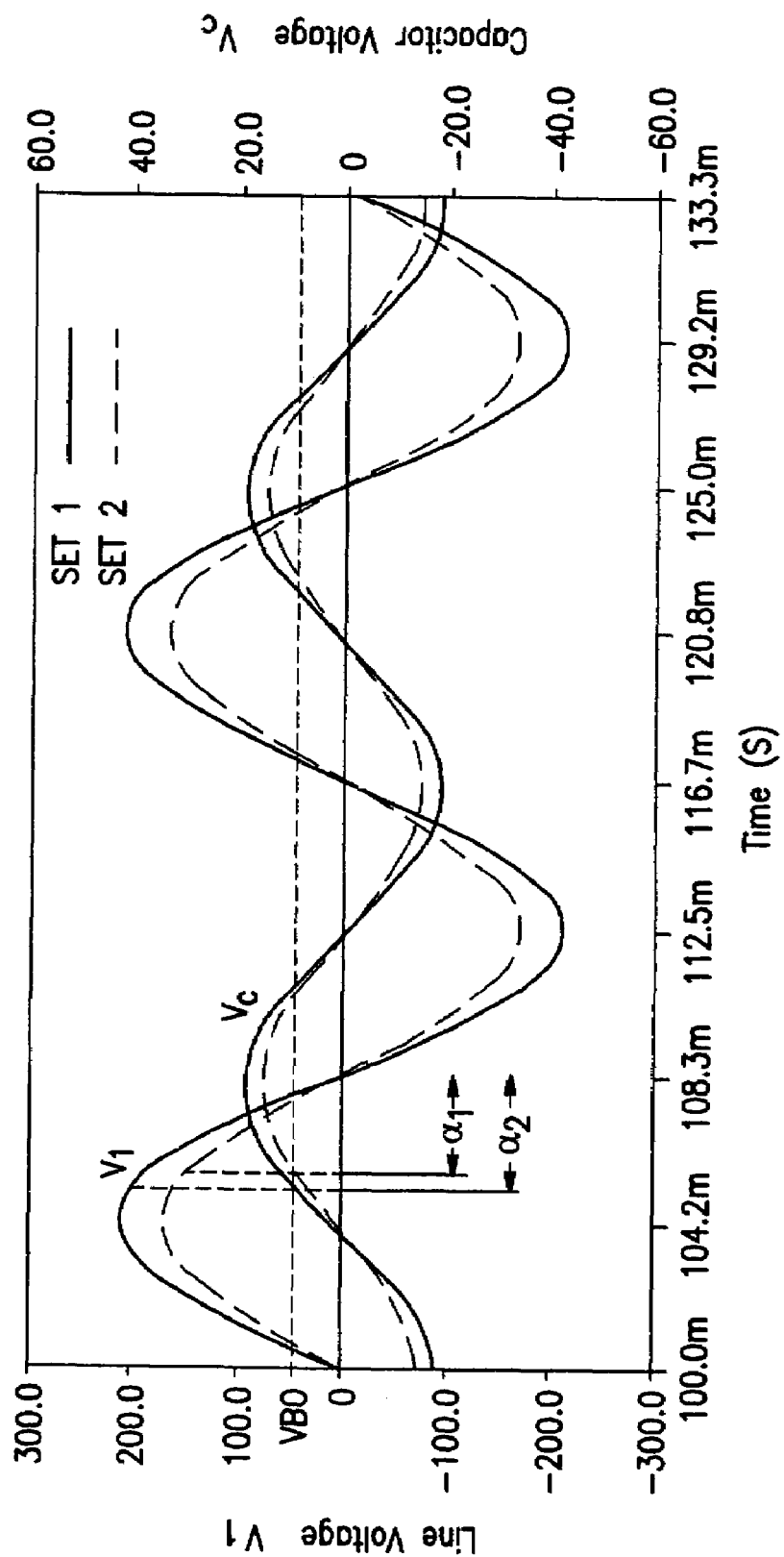
FIG. 4 is a graph showing how capacitor voltage affects conduction angle.
Figure 5:
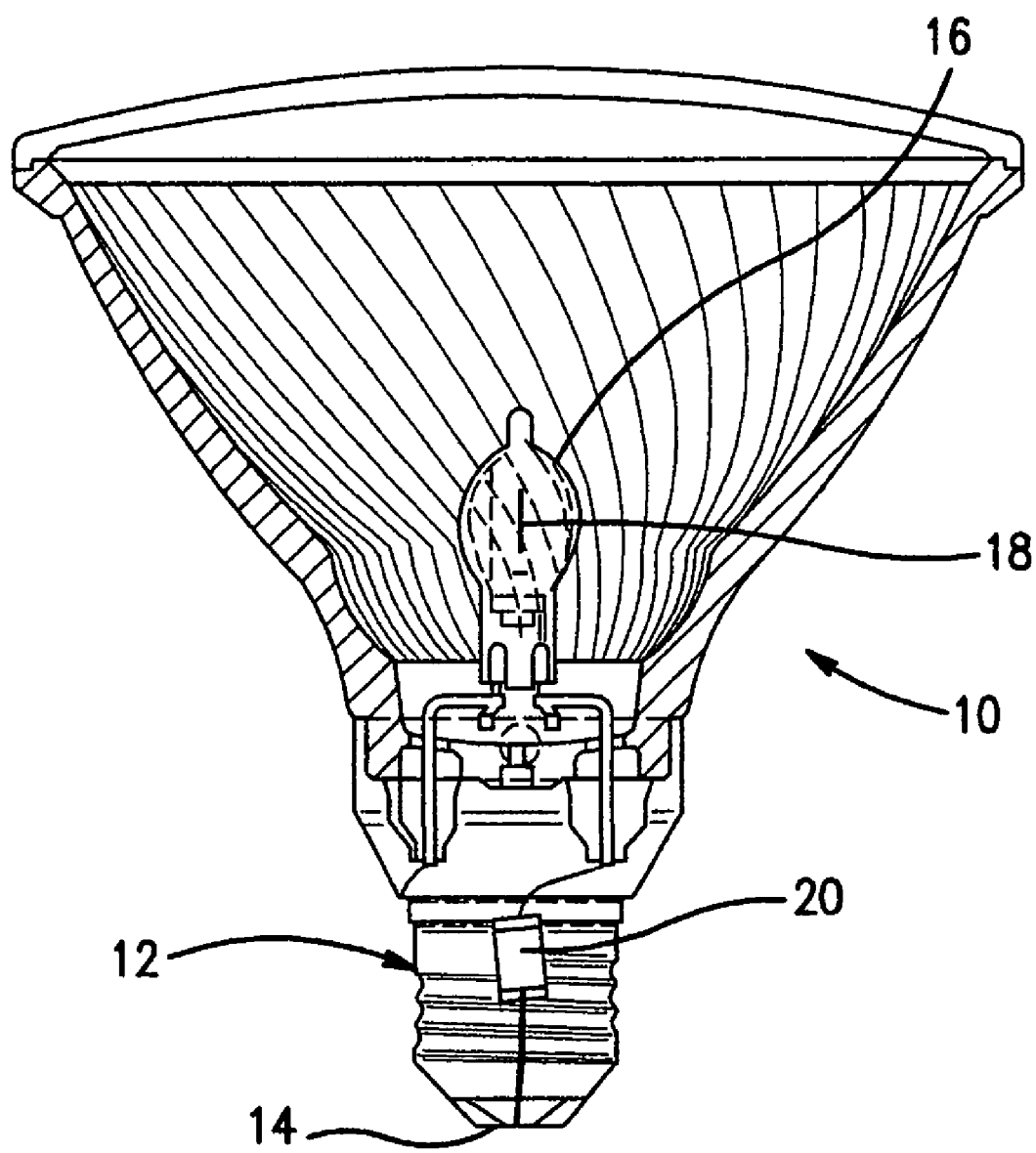
FIG. 5 is a partial cross section of an embodiment of a lamp of the present invention.

With reference now to FIG. 5, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 5), and a fixed phase power controller 20 for converting a line voltage at the lamp terminal 14 to a lower operating voltage. The power controller 20 is within the base 12 and connected between the lamp terminal 14 and the light emitting element 18. The power controller 20 may be an integrated circuit in a suitable package as shown schematically in FIG. 1. Preferably, the power controller 20 is entirely within the base as shown in FIG. 5.

While FIG. 5 shows the power controller 20 in a parabolic aluminized reflector (PAR) halogen lamp, the power controller 20 may be used in any incandescent lamp when placed in series between the light emitting element (e.g., filament) and a connection (e.g., lamp terminal) to a line voltage. Further, the power controller described and claimed herein finds application other than in lamps and is not limited to lamps.

Figure 6:
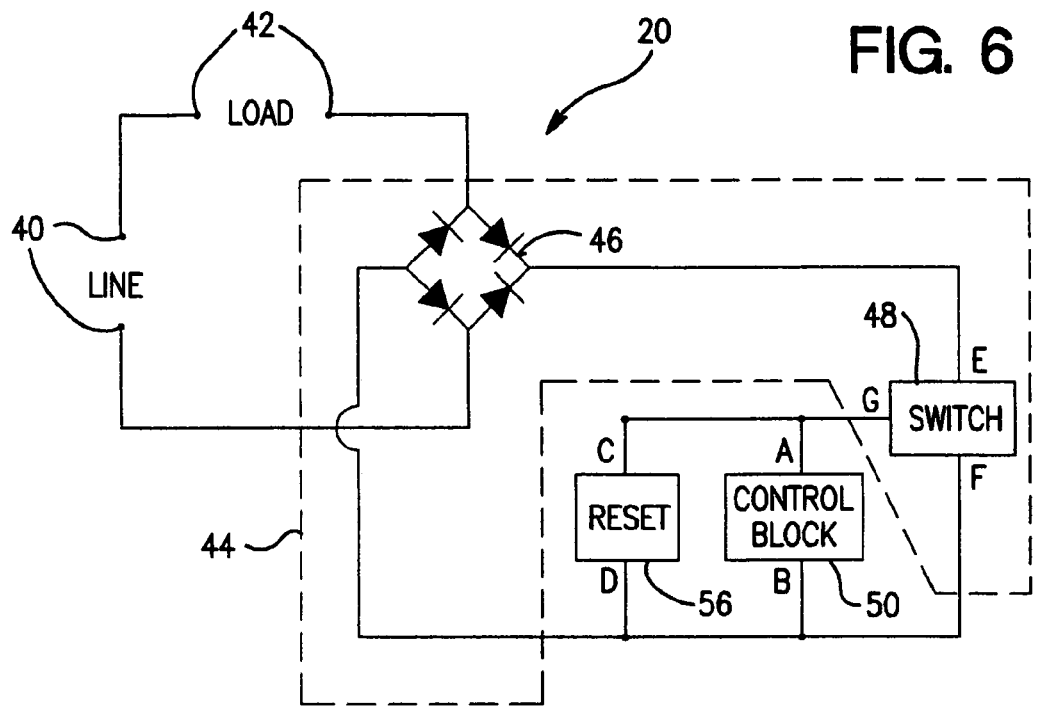
FIG. 6 is a schematic circuit diagram of a fixed phase power controller illustrating an embodiment of the present invention.

With reference to FIG. 6, an embodiment of the fixed phase power controller 20 of the present invention converts a line voltage at line terminals 40 to an RMS load voltage at load terminals 42. The power controller 20 includes a control circuit 44 that includes a full wave bridge 46 that is connected to the line and load terminals and a transistor switch 48 that is connected to the bridge 46 and that turns on and off to clip the load voltage to provide the desired RMS load voltage. As explained below, the clipping is carried out with a constant conduction angle that is independent of changes in the line voltage so that the phase of the circuit is fixed to provide a stable RMS load voltage even when the line voltage changes.

The power controller 20 also includes an analog control block 50 that triggers conduction of the transistor switch 48 at the appropriate frequency to define the RMS load voltage. The analog control block 50 receives an input that is independent of a change in magnitude of the line voltage and charges and discharges to provide a trigger signal at a first frequency that turns the transistor switch off and on so as to achieve the desired RMS load voltage.

Figure 7:
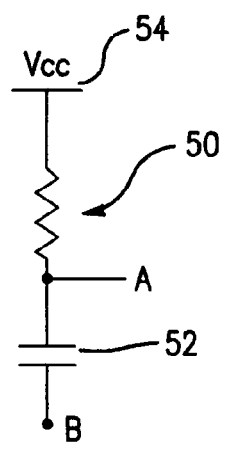
FIG. 7 is a schematic circuit diagram of an embodiment of the analog control block of FIG. 6.

In a preferred embodiment and with reference to FIG. 7, the analog control block 50 includes a capacitor 52 that receives a DC signal from a DC source 54 that is independent of the line voltage. The capacitor 52 receives the DC signal and is charged at a known rate based on its time constant and will discharge at a determinable level to provide the trigger signal to the transistor switch at a determinable frequency. Therefore, the timing to reach the triggering level can be hard-wired into the circuit to set the conduction angle of the fixed phase power controller. The capacitor may be replaced with an equivalent component or circuit that receives the DC signal and charges and discharges to provide the trigger signal at the first frequency.

Figure 8:
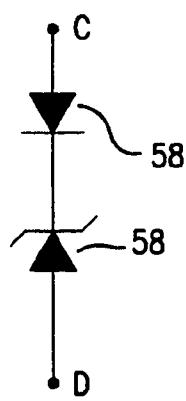
FIG. 8 is a schematic circuit diagram of an embodiment of the reset circuit of FIG. 6.

The preferred embodiment also includes a reset circuit 56 that resets the initial condition of the analog control block 50 each half cycle to ensure consistent triggering during operation. As seen in FIG. 8, the reset circuit preferably includes opposed diodes 58 (one of which may be a semiconductor controlled rectifier—SCR) that are connected in parallel with the analog control block 50. The opposed diodes may be replaced with an equivalent component or circuit that resets the initial condition of the analog control block.

The power controller preferably operates with the charging and discharging of the analog control block synchronized with the waveform of the line voltage. That is, in order for the conduction angle to be constant, the clipping should occur at the same place on the waveform each cycle. This is achieved by synchronizing the trigger signals with the waveform of the line voltage either at the analog control block 50 or the reset circuit 56. The embodiments shown in FIGS. 7–8 both include the synchronization connections that provide a sync signal, although such connections may be found in one of these.

Figure 9:
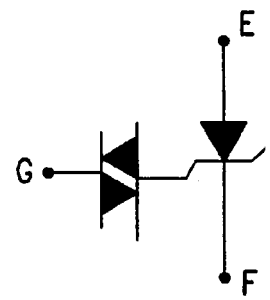
FIG. 9 is a schematic circuit diagram of an embodiment of the transistor switch of FIG. 6.

The transistor switch 48 can take various forms and may, for example, be an SCR, a triac, a diac or a diac in combination with an SCR or triac. FIG. 9 illustrates a diac 60 that turns on and off an SCR 62 in response to the trigger signal from the analog control block. Other equivalent transistor switches are known and usable herein (such as described in the above-noted applications), and need not be explained to those of skill in the art.

Figure 10:
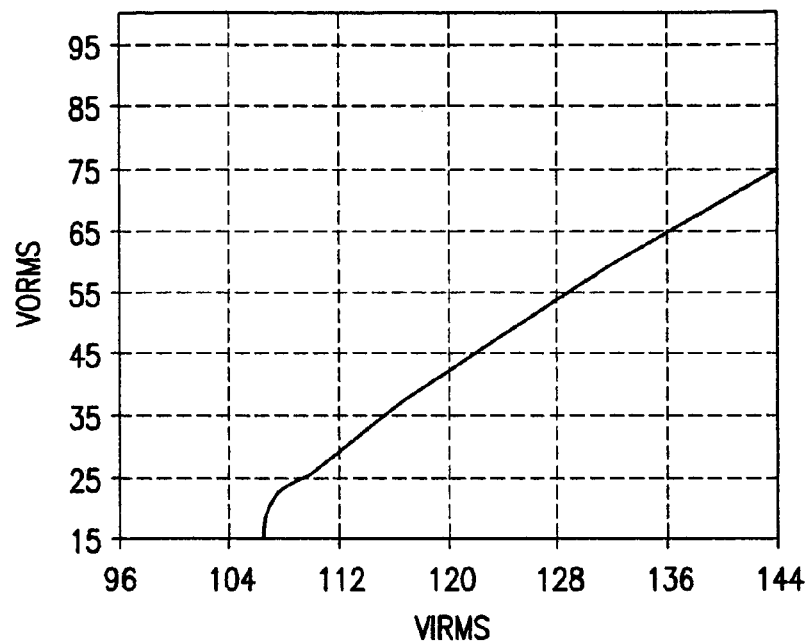
FIG. 10 is a graph showing the relationship between output voltage ($V_{ORMS}$) and input voltage ($V_{IRMS}$) for a prior art RC phase-controlled clipping circuit designed to produce $42V_{RMS}$ output (load voltage) for $120V_{RMS}$ input (line voltage).
Figure 11:
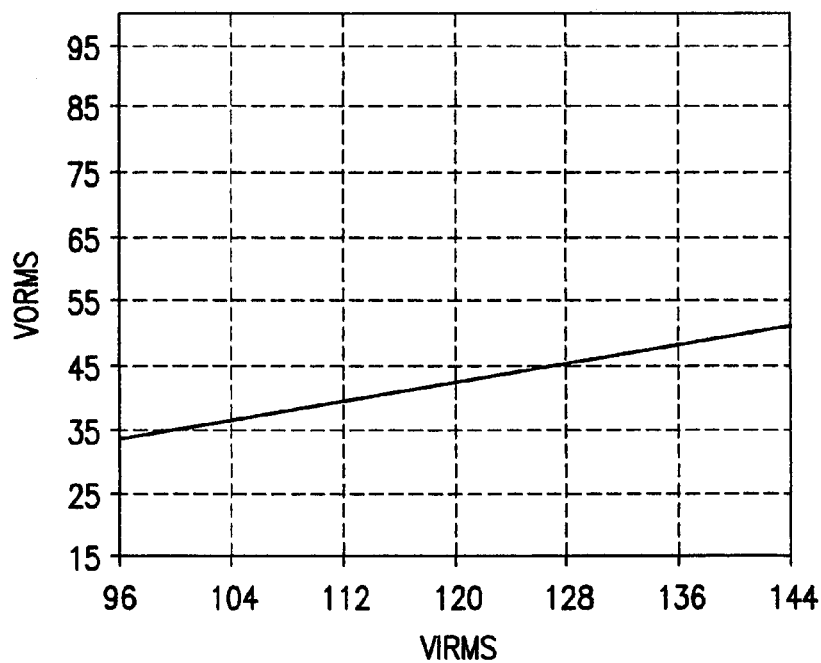
FIG. 11 is a graph showing the relationship between output voltage ($V_{ORMS}$) and input voltage ($V_{IRMS}$) for a fixed phase power controller of the present invention designed to produce $42V_{RMS}$ output (load voltage) for $120V_{RMS}$ input (line voltage).

In operation, the fixed phase clipping of the present invention provides a solution to the problem of conventional RC phase-controlled clipping. The solution is similar to the conventional scheme except that the conduction angle is independent of other circuit variables. FIGS. 10 and 11 illustrate the improvement of the present invention. FIG. 10 is a graph showing the relationship between output voltage ($V_{ORMS}$) and input voltage ($V_{IRMS}$) for a prior art RC phase-controlled clipping circuit designed to produce $42V_{RMS}$ output (load voltage) for $120V_{RMS}$ input (line voltage). FIG. 11 is a graph showing the relationship between output voltage ($V_{ORMS}$) and input voltage ($V_{IRMS}$) for a fixed phase power controller of the present invention designed to produce $42V_{RMS}$ output (load voltage) for $120V_{RMS}$ input (line voltage). As is apparent, the output voltage varies considerably less in a device of the present invention than in the comparable prior art device.

The description above refers to use of the present invention in a lamp. The invention is not limited to lamp applications, and may be used more generally where resistive or inductive loads (e.g., motor control) are present to convert an unregulated AC line or mains voltage at a particular frequency or in a particular frequency range to a regulated RMS load voltage of specified value.

While embodiments of the present invention have been described in the foregoing specification and drawings, it is to be understood that the present invention is defined by the following claims when read in light of the specification and drawings.

What is claimed is:

1. A fixed phase power controller that converts a line voltage to an RMS load voltage, the controller comprising:
   line terminals for a line voltage and load terminals for a load voltage;
   a full wave bridge connected to said line and load terminals;
   a transistor switch connected to said bridge and that clips the load voltage;
   a DC source that is independent of a change in magnitude of the line voltage;
   a capacitor that has one terminal connected to said DC source and to said transistor switch to turn said transistor switch off and on at a first frequency that defines the RMS load voltage; and
   a reset circuit connected in parallel with said capacitor for resetting said capacitor to an initial state at a rate that corresponds to the first frequency.

2. The controller of claim 1, wherein said transistor switch comprises at least one of an SCR, triac and diac.

3. The controller of claim 2, wherein said transistor switch comprises a diac and an SCR is triggered by said diac.

4. The controller of claim 2, wherein said transistor switch comprises a diac and a triac that is triggered by said diac.

* * * * *